United States Patent
Flosbach et al.

(10) Patent No.: US 8,663,740 B2
(45) Date of Patent: Mar. 4, 2014

(54) WATER-BASED TWO-COMPONENT COATING COMPOSITIONS

(75) Inventors: Carmen Flosbach, Wuppertal (DE); Stefanie Matten, Wuppertal (DE); Katharina Dreger, Dusseldorf (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 62 days.

(21) Appl. No.: 13/148,105

(22) PCT Filed: Apr. 29, 2010

(86) PCT No.: PCT/US2010/032931
§ 371 (c)(1),
(2), (4) Date: Aug. 5, 2011

(87) PCT Pub. No.: WO2010/127086
PCT Pub. Date: Nov. 4, 2010

(65) Prior Publication Data
US 2011/0293842 A1    Dec. 1, 2011

Related U.S. Application Data

(60) Provisional application No. 61/173,618, filed on Apr. 29, 2009.

(51) Int. Cl.
*B05D 3/02*    (2006.01)
(52) U.S. Cl.
USPC ........................................ 427/384; 427/385.5

(58) Field of Classification Search
None
See application file for complete search history.

(56) References Cited

U.S. PATENT DOCUMENTS

| | | | | |
|---|---|---|---|---|
| 3,502,601 A | * | 3/1970 | Case et al. | 521/172 |
| 2003/0130416 A1 | * | 7/2003 | Flosbach et al. | 524/801 |
| 2009/0021568 A1 | * | 1/2009 | Xu | 347/96 |

OTHER PUBLICATIONS

DE 19615494, Oct. 1997, original document and machine translation.*

* cited by examiner

*Primary Examiner* — Erma Cameron
(74) *Attorney, Agent, or Firm* — Ingrassia Fisher & Lorenz, P.C.

(57) ABSTRACT

The invention relates to a water-based coating composition comprising:
  A) at least one cross-linkable compound having at least one functional group containing active hydrogen,
  B) at least one polyisocyanate cross-linking agent with free isocyanate groups,
  C) at least one catalyst compound, said catalyst compound comprising at least one catalyst for the curing reaction between the functional groups containing active hydrogen of component A and the isocyanate groups of component B, and at least one cyclodextrine.

16 Claims, No Drawings

WATER-BASED TWO-COMPONENT COATING COMPOSITIONS

CROSS-REFERENCE TO RELATED APPLICATIONS

This is a National Stage filing of International Application No. PCT/US2010/032931, filed Apr. 29, 2010 and published in the English language, which claims the benefit of U.S. Provisional Application No. 61/173,618, filed Apr. 29, 2009.

FIELD OF THE INVENTION

The invention relates to water-based two-component coating compositions which contain cross-linkable binders, cross-linking agents and a latent catalyst for the curing reaction.

DESCRIPTION OF THE PRIOR ART

Due to its VOC-free or VOC-reduced character water-based two-component coating compositions based on a binder component and a polyisocyanate cross-linking agent are widespread in industrial and vehicle coating, in particular also in vehicle repair coating. Those coating compositions usually contain binder components with functional groups containing active hydrogen. The coating compositions have similar good technological properties as their solvent-borne counter parts, even if some deficiencies still need to be overcome. For example, in two-component water-based coating compositions, reaction bubbles caused by the reaction of isocyanate with water have to be avoided. Generally, on use in water-based coating compositions, a lower popping limit is observed, i.e. flaws such as popping marks are produced even at a relatively low film layer thickness of about 40 µm.

In particular for use in vehicle repair coating, a short drying time of the coating at moderate temperatures, for example from room temperature up to approx. 60° C., is desired. Drying or curing time may be markedly reduced by using catalysts for the cross-linking reaction. However, using catalysts also simultaneously leads to a reduction in pot life, i.e. a reduction in the time within which the coating composition can still satisfactorily be processed or applied.

Various approaches to solving this problem are already known.

It is known, for example, from WO 01/92362 to use photolatent catalysts, for example amines, in coating compositions based on a polyisocyanate cross-linking agent and a mercapto-functional binder. In the coating composition itself, the photolatent catalyst is inactive and is only activated after application by irradiation with high-energy radiation. An extended pot life may also be achieved in this manner. However, additional UV lamp equipment is required for this purpose and sensitizers, such as thioxanthones or benzophenones, must be used in addition to the photolatent catalysts. Moreover, rapid drying cannot be achieved in areas which are not reached by UV radiation.

Furthermore, it is known from WO 2006/030029 to use latent catalysts that can be activated by moisture in coating compositions containing polythiols and polyisocyanates. However, disadvantage of those coating compositions is that curing depends on the environmental conditions at application, in particular curing is remarkably effected by the humidity of the environment.

It is generally known that cyclodextrines are able to form host-guest-complexes with hydrophobic molecules. Those cyclodextrine complexes are commercially used, for example, in cosmetics, personal toiletries, foodstuff, sportswear and anti-smell sprays.

In addition a few applications of cyclodextrines are disclosed in coatings industry.

For example, in U.S. Pat. No. 4,711,936 the use of curing agents for epoxy resins has been disclosed, those curing agents comprising a cyclodextrine clathrate compound of a compound that is reactive with epoxy groups, e.g. of an amine compound. The curing agent also contains a trace amount of amylase. The curing agents are stable at room temperature and curing reaction is initiated by heating the curing agent at temperatures of 30° C. or higher. Thereby cyclodextrine is decomposed by the amylase and curing reaction can start. The compositions are solvent-based or solvent-free.

Also, Japanese patent application JP 06-329982 discloses rapidly curing mold polyurethane coatings. The compositions are solvent-based and comprise a mixture of a polyisocyanate, a polyol, cyclodextrine and a curing catalyst for the hydroxyl/isocyanate curing reaction, wherein the cyclodextrin shall serve as a host for the catalyst. Cyclodextrine and an amine catalyst are dissolved in N-methyl-2-pyrrolidone or in dimethyl formamide, then the mixture is added to the polyol component and mixed with the isocyanate component.

Water-based coating compositions containing thiol-functional or hydroxyl-functional compounds and polyisocyanate cross-linkers have not been disclosed in connection with cyclodextrin-catalyst complexes.

There is accordingly still a requirement for water-based two-component coating compositions, based on a binder component with functional groups containing active hydrogen and polyisocyanate cross-linking agents, which combine an adequate working time (pot-life) with a short drying time even at moderate temperatures of for example room temperature or 40° C. to 60° C. The water-based coating compositions should here yield coatings with very good technological properties, such as for example very good hardness and resistance to chemicals and water, and unblemished optical appearance. Even the formulation of clear coats with excellent optical appearance should be possible. The paint film should be high gloss and should be free from surface defects, such as pinholes and popping marks, even at relatively high coating thicknesses of, for example, 60 to 70 µm. Also, the coating compositions should not display any visual defects caused by the production of reaction bubbles resulting from the reaction of isocyanate and water.

SUMMARY OF THE INVENTION

This invention relates to water-based two-component coating compositions which contain compounds having functional groups containing active hydrogen, polyisocyanate cross-linking agents and a latent catalyst for the curing reaction.

The invention is therefore directed to water-based coating compositions comprising:
A) at least one cross-linkable compound having at least one functional group containing active hydrogen,
B) at least one polyisocyanate cross-linking agent with at least one free isocyanate group,
C) at least one catalyst compound, said catalyst compound comprising at least one catalyst for the curing reaction between the at least one functional group containing active hydrogen of component A and the at least one free isocyanate group of component B, and at least one cyclodextrine.

It has been found that the water-based coating compositions based on components A), B) and C) above have improved pot-life of, for example, 60 minutes to 20 hours, while retaining short drying times at room temperature or at elevated temperatures of, for example, 5-30 minutes at 40-80° C. In addition the water-based coating compositions can easily be applied up to coating thicknesses of, for example 60-70 μm without surface defects such as, for example, popping marks.

DETAILED DESCRIPTION OF THE EMBODIMENTS

These and other features and advantages of the present invention will be more readily understood, by those of ordinary skill in the art, from a reading of the following detailed description. It is to be appreciated those certain feature of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

Also, the disclosure of various ranges with numerical values specified in this application is intended as continuous range including every value between the minimum and maximum values, including the minimum and maximum end points of the range.

The term (meth)acrylic as used here and hereinafter should be taken to mean methacrylic and/or acrylic.

Unless stated otherwise, all the molar mass data, number-average molar mass data Mn or weight-average molar mass data Mw stated in the present description are molar masses determined or to be determined by gel permeation chromatography (GPC; divinylbenzene-crosslinked polystyrene as the immobile phase, tetrahydrofuran as the liquid phase, polystyrene standards).

The coating compositions according to the invention are liquid water-based coating compositions comprising binders, cross-linkers and a liquid carrier. The liquid carrier is water and may comprise in addition one or more organic solvents.

Water-based coating compositions are coating compositions, wherein water is used as solvent or thinner when preparing and/or applying the coating composition. Usually, water-based coating compositions contain about 20 to 80% by weight of water, based on the total amount of the coating composition and optionally, up to 15% by weight, preferably, below 10% by weight of organic solvents, based on the total amount of the coating composition.

The pot life is the time within which, once the mutually reactive components of a coating composition have been mixed, the coating composition may still be properly processed or applied and coatings of unimpaired quality can be achieved.

The coating compositions according to the invention are two-component coating compositions. The handling of two-component coating compositions generally requires mixing together the reactive components shortly before application to avoid premature reaction of the reactive components. The term "shortly before application" is well-known to a person skilled in the art working with two-component coating compositions. The time period within which the ready-to-use coating composition may be prepared prior to the actual use/application depends, e.g., on the pot life of the coating composition. Therefore, a sufficient long pot life is desired in order to have a comfortable time window for preparing/mixing and applying the two-component coating compositions.

The water-based coating compositions according to the invention contain the components A), B) and C).

Components A) and B) which are reactive with each other shall be stored separately and mixed together only shortly before application. Component C) can be either part of component A) and/or B) or can be a separate component. Preferably component C) is part of component A) or is a separate component.

Usually the coating compositions of the present invention comprise 20-80% by weight solids, preferably 30-70% by weight solids of the at least one component A) and 20-80% by weight solids, preferably 30-70% by weight solids of the at least one cross-linking agent B), relative to the entire coating composition.

The coating composition of the present invention preferably comprises the at least one catalyst compound C) in a ratio by weight of solids of catalyst compound C) to the sum of solids of cross-linkable component A) and isocyanate component B) of 0.5 to 15, more preferred of 1 to 8.

Component A) of the coating composition according to the invention comprises monomeric, oligomeric or polymeric compounds with functional groups reactive towards functional groups of cross-linking agent B). These compounds can be compounds in the form of low molar mass compounds defined by empirical and structural formula with molar mass in the range of 200 to 600 or oligomeric or polymeric binders. The binders are compounds with a number average molar mass (Mn) of, e.g., 500 to 500,000 g/mole, preferably of 1100 to 300,000 g/mole. The functional groups with active hydrogen may be for example hydroxyl groups, thiol groups, primary and/or secondary amino groups or combinations thereof. Compounds with hydroxyl groups and/or thiol groups are preferably used as component A).

Examples of useful components A) are described in the following.

The binders with hydroxyl groups are for example the polyurethanes, (meth)acrylic copolymers, polyesters, polyethers and other binders, known from polyurethane chemistry to the skilled person, which are used in the formulation of water-based coating compositions. They may each be used individually or in combination with one another.

Examples of suitable polyurethane resins include all polyurethane resins which are suited for water-based coating compositions and known to a skilled person. Examples are polyurethane resins, for example, with a number average molar mass Mn of 500 to 500 000 g/mol, preferably, of 1100 to 300 000 g/mol, most preferably, of 5000 to 300 000 g/mol, an acid value of 0 to 100 mg KOH/g, preferably of 20 to 80 mg KOH/g, and a hydroxyl value of 40 to 400 mg KOH/g, preferably, of 80 to 250 mg KOH/g. Appropriate polyurethane resins which may be used are, for example, prepared by reacting compounds which are reactive with respect to isocyanate groups and polyisocyanates having at least 2 free isocyanate groups per molecule.

Polyols of high molecular weight can be used as compounds which are reactive with respect to isocyanate groups, preferably, polyester polyols, polyether polyols and/or polycarbonate polyols with a molecular weight of, for example, 500-6000 g/mol. Polyols of low molecular weight with a molecular weight of 60-400 g/mol can also be co-used. Aliphatic and/or cycloaliphatic diisocyanates can preferably be used as polyisocyanates. Examples of useful polyisocyanates are phenylene diisocyanate, xylylene diisocyanate, diphenylmethane diisocyanate, isophorone diisocyanate, dicyclohexylmethane diisocyanate, tetramethylene diisocyanate, hexamethylene diisocyanate.

The thus obtained polyurethane resins can still be subjected to chain extension to increase the molar mass. For example, NCO-functional polyurethane prepolymers can be reacted with compounds, which are reactive with respect to isocyanate groups. Compounds, which are reactive with respect to isocyanate groups, are in particular compounds with hydroxyl and/or secondary and/or primary amino groups. OH-functional polyurethane prepolymers can be chain extended for example with polyisocyanates The polyurethane resins include such resins which are in modified form, for example, as silicon-modified or (meth)acrylated polyurethane resins. Examples of polyurethane resins which may be used are described in U.S. Pat. No. 5,492,961, U.S. Pat. No. 5,141,987, U.S. Pat. No. 5,556,912, DE-A-41 15 042, U.S. Pat. No. 5,635,559, U.S. Pat. No. 5,691,425, DE-A-42 28 510, U.S. Pat. No. 5,854,337 and U.S. Pat. No. 4,489,135.

Examples of hydroxyl-functional poly(meth)acrylate resins include all poly(meth)acrylate resins which are suited for water-based coating compositions and known to a skilled person. For example, they can be those with a number average molar mass Mn of 1000-20000 g/mol, preferably, of 1100-15000, an acid value of 0-100 mg KOH/g, preferably, of 15-50 and a hydroxyl value of 40-400 mg KOH/g, preferably, of 60-200 mg KOH/g.

The poly(meth)acrylate copolymer can be prepared by free-radical polymerization of polymerizable, olefinically unsaturated monomers, optionally, in presence of oligomeric or polymeric polyester and/or polyurethane resins. Free-radically polymerizable, olefinically unsaturated monomers, which may be used are monomers which, in addition to at least one olefinic double bond, also contain further functional groups and monomers which, apart from at least one olefinic double bond, contain no further functional groups. Further functional groups may be, for example, urea, hydroxyl, carboxyl, sulfonic acid, silane, amine, amide, acetoacetate or epoxy groups. It would be clear that only those functional groups can be combined in the poly(meth)acrylate copolymer which do not tend to self-crosslink.

Olefinically unsaturated monomers with hydroxyl groups are used to introduce hydroxyl groups into the (meth)acrylic copolymers. Suitable hydroxy-functional unsaturated monomers are, for example, hydroxyalkyl esters of alpha, beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. The hydroxyalkyl esters of (meth)acrylic acid are preferred. Further olefinically unsaturated monomers with hydroxyl groups may, of course, also be used.

Carboxyl functional olefinically unsaturated monomers are used to introduce carboxyl groups into the (meth)acrylic copolymers. Examples of suitable olefinically unsaturated carboxylic acids include acrylic acid, methacrylic acid, crotonic acid and isocrotonic acid, itaconic acid, maleic acid, fumaric acid and the halfesters of the difunctional acids. Acrylic and methacrylic acid are preferred.

Unsaturated monomers which, apart from at least one olefinic double bond, contain no further functional groups are, for example, aliphatic esters of olefinically unsaturated carboxylic acids, such as (meth)acrylic acid, vinyl esters and/or vinylaromatic hydrocarbons such as styrene.

Also, other additional unsaturated monomers, which contain apart from an olefinic double bond further functional groups can be used.

Examples of polyester resins which can be used as binder component A) include all polyester resins which are suited for water-based coating compositions, for example, hydroxy-functional polyesters with a number average molar mass of 500-10,000 g/mol, preferably, of 1100-8000 g/mol, an acid value of 0-150 mg KOH/g, preferably, of 15-50 mg KOH/g and a hydroxyl value of 40-400 mg KOH/g, preferably, of 50-200 mg KOH/g. The polyesters may be saturated or unsaturated and they may optionally be modified with fatty acids. The polyesters are produced using known processes with elimination of water from polycarboxylic acids and polyalcohols.

Thiol-functional compounds A) that can be used in the coating composition according to the invention are compounds in the form of low molar mass compounds defined by empirical and structural formula with molar mass in the range of 200 to 600 or oligomeric or polymeric binders. The binders are compounds with a number average molar mass (Mn) of, e.g., 500 to 500,000 g/mole, preferably of 1100 to 300,000 g/mole.

Thiol-functional compounds A) that can suitably be used in the coating composition according to the invention include dodecyl mercaptan, mercapto ethanol, 1,3-propanedithiol, 1,6-hexanedithiol, methylthioglycolate, 2-mercaptoacetic acid, mercaptosuccinic acid, and cysteine. Also suitable are esters of a thiol-functional carboxylic acid with a polyol, such as esters of 2-mercaptoacetic acid, 3-mercaptopropionic acid, 2-mercapto-propionic acid, 11-mercaptoundecanoic acid, and mercaptosuccinic acid. Examples of such esters include pentaerythritol tetrakis(3-mercaptopropionate), pentaerythritol tetrakis(2-mercaptoacetate), trimethylol propane tris(3-mercaptopropionate), trimethylol propane tris(2-mercaptopropionate), and trimethylol propane tris(2-mercaptoacetate). A further example is a compound of a hyperbranched polyol core based on a starter polyol, e.g. trimethylol propane and dimethylol propionic acid, which is subsequently esterified with 3-mercaptopropionic acid and isononanoic acid. Those compounds are described for example in EP 0 448 224.

Thiol-functional compounds can also be prepared by addition of $H_2S$ to epoxy-functional compounds. These compounds may have a structure of the following formula $T[(O—CHR—CH_2—O)_nCH_2CHXHCH_2YH]_m$, with T being a m valent organic moiety wherein m is an integer between 1 and 25, R being hydrogen or methyl, n being an integer between 0 and 30, X and Y being oxygen or sulfur, with the proviso that X and Y are not equal.

Other syntheses to prepare compounds comprising thiol-functional groups include: the reaction of an aryl or alkyl halide with NaHS to introduce a pendant mercapto group into the alkyl and aryl compounds; the reaction of a Grignard reagent with sulfur to introduce a pendant mercapto group into the structure; the reaction of a polymercaptan with a polyolefin according to a nucleophilic reaction; an electrophilic reaction or a radical reaction; the reaction of disulfides.

In another embodiment the thiol group of the thiol-functional compound A) can be covalently attached to a resin. Such resins include thiol-functional polyurethane resins, thiol-functional polyester resins, thiol-functional polyaddition polymer resins, thiol-functional polyether resins, thiol-functional polyamide resins, thiol-functional polyurea resins, and mixtures thereof. Thiol-functional resins can be prepared by the reaction of $H_2S$ with an epoxy group or an unsaturated carbon-carbon bond-containing resin, the reaction between a hydroxyl-functional resin and a thiol-functional acid, and by the reaction of an isocyanate-functional polymer and either a thiol-functional alcohol or a di- or polymercapto compound.

A thiol-functional polyurethane resin can be the reaction product of a mono-, di-, tri- or tetrafunctional thiol compound with an isocyanate-terminated polyurethane and preferably is the reaction product of a diisocyanate compound and a diol-functional compound. Suitable thiol-functional polyurethane resins are obtainable by first preparing an isocyanate-functional polyurethane from diols, diisocyanates, and optionally compounds with ionic or non-ionic hydrophilic groups to stabilize the resin in an aqueous phase, followed by reaction of the isocyanate-functional polyurethane with a polyfunctional thiol in a base-catalyzed addition reaction.

The thiol-functional resin can also be a polyester prepared from at least one polycarboxylic acid or reactive derivatives thereof, at least one polyol, and at least one thiol-functional carboxylic acid. The polyesters preferably possess a branched structure.

The thiol-functional resin can also be a thiol-functional polyaddition polymer, for example a poly(meth)acrylate. Such a poly(meth)acrylate is derived from hydroxyl-functional (meth)acrylic monomers, such as hydroxyethyl(meth)acrylate, hydroxypropyl(meth)acrylate, hydroxybutyl(meth)acrylate, and other ethylenically unsaturated polymerizable monomers as can be usually used for the preparation of poly(meth)acrylates. Examples of other ethylenically unsaturated monomers are carboxyl functional olefinically unsaturated monomers, such as acrylic acid or methacrylic acid and unsaturated monomers, which contain apart from an olefinic double bond no further functional groups are, for example, aliphatic esters of olefinically unsaturated carboxylic acids, vinyl ester and/or vinylaromatic hydrocarbons.

Examples of suitable aliphatic esters of olefinically unsaturated carboxylic acids include, in particular, esters of alpha, beta-olefinically unsaturated monocarboxylic acids with aliphatic alcohols.

The thiol group is introduced by esterification of at least part of the hydroxyl groups of the acrylate copolymer with one or more thiol-functional carboxylic acids, for example, those as described above. Alternatively, glycidyl methacrylate is introduced into the polymer to prepare an epoxy-functional poly(meth)acrylate. The epoxy groups are then reacted with suitable thiol-functional carboxylic acids such as mentioned above.

Examples of suitable thiol functional compounds are described in WO 2006/064035 and WO 2005/123862.

In particular pentaerythritol tetrakis(3-mercapto propionate) and trimethylolpropane tris(3-mercaptopropionate) can be used as thiol-functional compounds A, optionally in combination with other thiol-functional compounds.

In order to ensure sufficient water dilutability of the binders A) these binders may be modified in a suitable manner to render them hydrophilic. The binders A) may be ionically (anionically and/or cationically) and/or non-ionically modified. An anionic modification and an anionic modification in combination with a non-ionic modification is preferred. Preferably, water-dilutable binders A) may contain carboxylic acid groups, sulfonic and/or phosphonic acid groups. Carboxylic acid groups are most preferred in case of hydroxyl-functional binders A). Also, emulsifiers can be used, alone or in addition to a hydrophilic modification of the binders A).

The compounds of component A) of the present invention may contain in addition compounds with at least one thiol group and at least one hydroxyl group in the same molecule.

The compounds A) can be used individually or in combination.

The coating compositions, according to the invention contain polyisocyanates with free isocyanate groups as cross-linking agents (component B). Examples of the polyisocyanates are any number of organic di- or higher functional isocyanates with aliphatically, cycloaliphatically, araliphatically and/or aromatically bound free isocyanate groups. The polyisocyanates are liquid at room temperature or become liquid through the addition of organic solvents. At 23° C., the polyisocyanates generally have a viscosity of 1 to 6,000 mPas, preferably, of 5 to 3,000 mPas.

The preferred polyisocyanates are polyisocyanates or polyisocyanate mixtures with exclusively aliphatically and/or cycloaliphatically bound isocyanate groups with an average NCO functionality of 1.5 to 5, preferably 2 to 4.

Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (IPDI) and/or bis(isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than 0.5% by weight. Triisocyanates, such as, triisocyanatononan can also be used.

Sterically hindered polyisocyanates are also suitable. Examples of these are 1,1,6,6-tetramethyl-hexamethylene diisocyanate, 1,5-dibutyl-penta-methyldiisocyanate, p- or m-tetramethylxylylene diisocyanate and the appropriate hydrated homologues.

In principle, diisocyanates can be converted by the usual method to higher functional compounds, for example, by trimerization or by reaction with water or polyols, such as, for example, trimethylolpropane or glycerine. The polyisocyanates can also be used in the form of isocyanate-modified resins.

Also, hydrophilic polyisocyanates may be used. Hydrophilic polyisocyanates are any polyisocyanates that have been modified with hydrophilic groups, particularly with chemically incorporated hydrophilic groups, which takes care that the polyisocyanate is water dispersible. Hydrophilic groups to be used to modify the polyisocyanates can be ionic, in particular anionic hydrophilic groups and/or nonionic hydrophilic groups. An anionic modification may be obtained, for example, by incorporating carboxyl groups, sulfonic acid groups and/or phosphonic acid or phosphoric acid groups into the polyisocyanate. A non-ionic modification may be obtained, for example, by incorporating polyethylene oxide units.

The polyisocyanate cross-linking agents can be used individually or in combination.

The polyisocyanate cross-linking agents are those commonly used in the paint industry, and are described in detail in the literature and are also obtainable commercially.

The catalyst compounds C) contain cyclodextrin and at least one catalyst that is able to accelerate the curing reaction between components A) and B). It is assumed that the catalyst is present in form of a cyclodextrin-complex, i.e. that the cyclodextrin forms with the catalyst a so-called host-guest complex with cyclodextrin as the host and the catalyst as the guest. It is also assumed that the catalyst has no or only very little catalytic activity when being present in form of the cyclodextrin complex, but becomes active during and/or after application and/or during and/or after film formation.

Suitable catalysts are all compounds capable of accelerating the reaction of the functional groups containing active hydrogen of component A) and the isocyanate groups of the isocyanate-functional compound B). Generally, suitable catalysts are basic catalysts. Examples are inorganic basic compounds, such as hydroxides and basic oxides of metals. Suitable examples of hydroxides of metals are sodium, potassium, calcium and magnesium hydroxide. Also, quaternary ammonium hydroxides, such as tetraethyl ammonium hydroxide, can be used.

Furthermore, amines can be used as catalyst in the present invention. Suitable amines that can be used are secondary monoamines, for example, morpholine, diethyl amine, dibutyl amine, N-methyl ethanol amine, diethanol amine, and diisopropanol amine. Also suitable are diamines and polyamines, such as the addition products of epoxides and ammonia or the addition products of epoxides and primary, secondary or tertiary amines.

Also suitable, even if not preferred, are primary amines, such as isopropyl amine, butyl amine, ethanol amine, 3-amino-1-propanol, 1-amino-2-propanol, 2-amino-2-methyl-1-propanol and 2-amino-2-methyl-1,3-propane diol.

Tertiary amines are a particularly suitable class of basic catalysts. Examples of suitable tertiary amines include trimethyl amine, triethyl amine, triisopropyl amine, triisopropanol amine, N,N-dimethyl ethanol amine, dimethyl isopropyl amine, N,N-diethyl ethanol amine, 1-dimethyl amino-2-propanol, 3-dimethyl amino-1-propanol, 2-dimethyl amino-2-methyl-1-propanol, N-methyl diethanol amine, triethanol amine, N-ethyl diethanol amine, N-butyl diethanol amine, N,N-dibutyl ethanol amine, and N-ethyl morpholine.

Also suitable are 1,4-diazabicyclo[2.2.2]octane (DABCO), 1,8-diazabicyclo[5.4.0]undec-7-ene (DBU), 1,5-diazabicylo[4.3.0]non-5-ene, guanidine, guanine, guanosine, melamine, and mixtures and derivatives thereof.

The catalyst in the coating composition of the present invention can alternatively be a metal compound with an organic ligand where the metal is a metal of groups 3 to 15 of the Periodic Table. In case of thiol-functional components A) the metal is preferably a transition metal. More preferably, the metal is a metal of Period 4 of the Periodic Table, e.g., Zr or Ti.

In case of hydroxyl-functional components A) the metal is preferably tin, zinc, bismuth and zirconium. Most preferred is tin.

The metal compounds comprise metal salts and/or complexes of organic compounds. The organic compounds are compounds having 2 to 40 carbon atoms, optionally comprising atoms such as O, N, and S. The metal salts comprise anions selected from the group of carboxylates. Examples thereof include propionate, butyrate, pentanoate, 2-ethyl hexanoate, naphthenate, oxalate, malonate, succinate, glutamate, and adipate. The metal complexes comprise ligands selected from the group of beta-diketones, alkyl acetoacetates, alcoholates, and combinations thereof. Examples thereof include acetyl acetone (2,4-pentanedione), 2,4-heptanedione, 6-methyl-2,4-heptadione, 2,4-octanedione, propoxide, isopoxide, and butoxide. Preferably, the metal compound is a metal complex. Examples of metals include aluminium, titanium, zirconium, and hafnium.

Examples of metal complexes include aluminium complexed with 2,4-pentanedione, aluminium triacetyl acetonate, zirconium tetraacetyl acetonate, zirconium tetrabutanolate, titanium tetrabutanolate, titanium acetylacetonate, zirconium complexed with 6-methyl-2,4-heptadione, aluminium triisopropoxide, and titanium diisopropoxide bis-2,4(pentadionate). Those metal complexes are commercially available, for example, under the trade name Tyzor® from DuPont oder K-KAT® XC6212 from King Industries.

In case of thiol-functional components A) preferred catalysts are tertiary amines, for example, the tertiary amines mentioned above.

In case of hydroxyl-functional components A) tin catalysts and tertiary amines are most preferred catalysts. Examples of tin catalysts are organotin carboxylates, e.g. dialkyl tin carboxylates of aliphatic carboxylic acids, such as dibutyl tin dilaurate (DBTL). Also, tertiary amines are preferred catalysts, for example, the tertiary amines mentioned above. In particular suitable are N,N-dimethyl ethanol amine, 1,4-diazabicyclo[2.2.2]octane (DABCO) and 1,8-diazabicyclo [5.4.0]undec-7-ene (DBU).

Catalysts can be used as single catalysts or in combination with each other. If component A) contains hydroxyl and thiol groups appropriate catalyst have to be selected for each curing chemistry.

As already explained, it is assumed that the catalysts assume the form of host-guest complexes with cyclodextrin. In connection with such complexes, it is described that due to the specific arrangement within the molecule a conical overall structure of the cyclodextrin is obtained, the resultant cavity being capable of accommodating guest molecules.

The cyclodextrins used may be alpha-, beta-, gamma- and delta-cyclodextrins. These are known and also commercially available. They consist of D-glucose units, for example 6 to 13 D-glucose units, preferably 6 to 9 D-glucose units and are joined together via an alpha-1,4-glycoside bond. Cyclodextrin derivatives may also be used. Cyclodextrin derivatives should be taken to mean reaction products of cyclodextrins with reactive compounds. Ester or ether groups conventionally arise from the reaction of cyclodextrins with such reactive compounds. These may for example comprise reaction products of cyclodextrins with alkylene oxides, such as for example ethylene, propylene or butylene oxide, or reaction products of cyclodextrins with alkylating agents, such as for example C1- to C10 alkyl halides, such as methyl, ethyl, butyl, lauryl and stearyl chloride. The cyclodextrin derivatives may exhibit a variable degree of alkylation, for example a degree of alkylation of 20-80%.

It is furthermore also possible to use cyclodextrin derivatives based on reaction products of cyclodextrin with chloroacetic acid and on enzymatic linkage with maltose oligomers. Examples of readily usable cyclodextrin derivatives are methylcyclodextrin, dimethyl-beta-cyclodextrin, hydroxypropylcyclodextrin, acetylcyclodextrin and sulfonatopropylhydroxypropyl-beta-cyclodextrin. Good solubility of the cyclodextrin in organic solvents may in particular be achieved by methylation or hydroxypropylation which facilitates production of the cyclodextrin/catalyst compound and the incorporation thereof into coating compositions.

Methylated and/or hydroxypropylated cyclodextrins may preferably be used.

The cyclodextrins may be used individually or in combination.

Assuming the formation of host-guest cyclodextrine complexes complexation can be seen as a molecular phenomenon where one or more molecules of guest (e.g. the catalyst) and one or more molecules of cyclodextrin come into contact with each other to associate and form a complex. Several methods can be used to form those complexes.

Production of the catalyst/cyclodextrin compound may proceed as follows:

For example, a solution of cyclodextrin is made and the catalyst is added to the solution while stirring. Conditions may be selected such that the solubility of the complex is exceeded and the complex can thus be collected as precipitate by filtration or centrifugation. As an alternative the solvent may be distilled off.

The cyclodextrin may be dissolved in one or more suitable organic solvents and/or water. Organic solvents which may be used are, for example, alcohols, such as ethanol, propanol, alkoxypropanols, such as methoxypropanol, ethoxypropanol, ketones, such as acetone, methyl ethyl ketone, or ester ketones, such as methoxypropyl acetate. For example, organic or aqueous cyclodextrin solutions containing 1-50% by weight of the cyclodextrin may be produced.

The catalyst is then added to the cyclodextrin solution. The ratio of cyclodextrin molecules to catalyst molecules may be in the range from 1:1 to 4:1 and is preferably conventionally 1:1 to 2:1. An excess of cyclodextrin may be required for some complexes, for example a ratio of cyclodextrin molecules to catalyst molecules of at least 1.2:1. During addition, the catalyst is likewise present dissolved or dispersed in an organic solvent, which may, for example, comprise the same organic solvent or solvent mixture as for the production of the cyclodextrin solution. It is, however, also possible to add the catalyst directly as such. Once the cyclodextrin and catalyst component have been mixed, it is advantageous to perform intimate mixing over an extended period, for example with stirring at room temperature within 5 to 24 hours.

The resultant liquid catalyst/cyclodextrin compound may be used directly as such. It may, however, also be dried under suitable conditions and used as a solid or powder. For example, the solvent may be removed under a vacuum or it may be filtered out or centrifuged off, after which drying may be performed, for example at 50° C. to 70° C.

The powder obtained by means of drying may likewise be re-dissolved in one or more organic solvents and used as a liquid composition.

The catalyst compound C) may, therefore, contain in addition to the catalyst and the cyclodextrin at least one organic solvent and/or water.

Readily usable liquid catalyst compounds C) here comprise, for example, 1-50% by weight, preferably 3-20% by weight of the catalyst/cyclodextrin compound. A solution or dispersion of the catalyst/cyclodextrin compound in water is preferred.

Selection of the appropriate solvent is determined, for example, by the type of catalyst and the type of cyclodextrin. Moreover, no solvents should be used which themselves have a catalytic action or release the catalyst prematurely. It has been found that, for example, amine nitrogen containing organic solvents such as N-methylpyrrolidone, N-ethyl pyrrolidone and dimethyl formamide are not preferred organic solvents to prepare a liquid catalyst/cyclodextrin compound C).

Organic solvents which may particularly readily be used to prepare the liquid catalyst compound C) are alcohols, ether alcohols, ketones and ester ketones. Examples of alcohols are linear or branched alcohols having 1-6 carbon atoms in the molecule. Examples of useful alcohols are ethanol, propanol, alkoxypropanols, such as methoxypropanol and ethoxypropanol. Examples of useful ketones or ester ketones are acetone, methyl ethyl ketone and methoxypropyl acetate and similar alkoxyalkyl acetates.

According to one embodiment of the present invention catalyst compound C) is a solid compound. Preferably the solid catalyst compound C) consists of at least one catalyst and at least one cyclodextrin.

According to a second embodiment of the present invention catalyst compound C) is a liquid compound. Preferably the liquid catalyst compound C) consists of at least one catalyst, at least one cyclodextrin and at least one organic solvent and/or water.

According to a third embodiment of the present invention catalyst compound C) is a liquid compound containing at least one catalyst, at least one cyclodextrin and at least one organic solvent, wherein the at least one organic solvent is selected from the group consisting of alcohols, ether alcohols, ketones, ester ketones and mixtures thereof.

According to a particularly preferred embodiment of the present invention catalyst compound C) is a liquid compound containing at least one catalyst, at least one cyclodextrin and water. Preferably that liquid component C) consists of at least one catalyst, at least one cyclodextrin and water.

The catalyst compound C) being present in form of an aqueous solution or dispersion allows to easily and homogeneously work in the compound C) into the water-based coating composition.

The resultant liquid or solid catalyst compound C) may then be added to the coating composition or to one of the components of the coating composition. As already mentioned, the catalyst compounds C) may be added to the cross-linkable component A) and/or to the polyisocyanate component B) or stored in said components. It is, however, also possible to provide the catalyst compound C) as a separate component and only to incorporate it as a third component when the cross-linkable component A) and the polyisocyanate component B) are mixed together.

Therefore, the present invention is also directed to a process for preparing water-based coating compositions comprising:
A) at least one cross-linkable compound having at least one functional group containing active hydrogen,
B) at least one polyisocyanate cross-linking agent with at least one free isocyanate group,
C) at least one catalyst compound, said catalyst compound comprising at least one catalyst for the curing reaction between the at least one functional groups containing active hydrogen of component A and the at least one free isocyanate group of component B, and at least one cyclodextrine, comprising the steps:
I. Providing component A),
II. Mixing said component A) provided in step I with a liquid catalyst compound C) or with a solid catalyst compound C), and
III. Mixing the composition obtained in step II with the polyisocyanate component B).

Preferably component A) is mixed with a liquid catalyst compound C), wherein the liquid catalyst compound C) comprises the at least one catalyst, the at least one cyclodextrine and at least one organic solvent and/or water. More preferred component A) is mixed with a liquid catalyst compound C), wherein the liquid catalyst compound C) consists of the at least one catalyst, the at least one cyclodextrine and water.

Thereby component A), component B) and component C) can be stored separately until mixing or a mixture of components A) and C) and a separate component B) can be stored until mixing.

Generally catalyst compound C), the preferred catalyst compound C) and the more preferred catalyst compound C) can also be mixed first with isocyanate component B) or with any other ingredient of the coating composition and can then be added in any order to other components of the coating composition to formulate the final coating composition.

It goes without saying that all embodiments and preferred embodiments related to the water-based coating composition and disclosed above in the description of the water-based coating composition also apply for the water-based coating composition to be used in the above process for preparing water-based coating compositions.

The molar ratio of groups reactive towards functional groups of the cross-linking agent, in particular the thiol and/or hydroxyl groups from the at least one compound A) to the isocyanate groups of the at least one polyisocyante cross-linking agent B), is for example, 0.5:1 to 3:1, in particular 0.7:1 to 2:1.

Components A, component B or both components may contain free-radically polymerizable olefinic double bonds. The coating compositions according to the invention may then be cured not only by the reaction of the thiol groups of component A) with the isocyanate groups of the cross-linking agent B) but additionally by free-radical polymerization of the olefinic double bonds, in particular, by photochemically induced free-radical polymerization. Such compositions are also known as "dual-cure" coating compositions. In one embodiment components A and B are free of additional free-radically polymerizable olefinic double bonds.

The coating compositions according to the invention have a solids content of, for example, 30 to 85 wt. %, preferably 35 to 75 wt. %.

The water-based coating compositions, according to the invention, contain furthermore water and optionally organic solvents. The water-based coating compositions contain, for example, 30-70% by weight of water, and possibly small amounts of organic solvents, e.g., up to 15% by weight, preferably, up to 10% by weight based on the entire coating composition.

The organic solvents are solvents conventionally used in coating techniques. These may originate from the preparation of the binders or are added separately. Examples of suitable solvents are monohydric or polyhydric alcohols, e.g., propanol, butanol, hexanol; glycol ethers or esters, for example, diethylene glycol dialkyl ether, dipropylene glycol dialkyl ether, each with C1- to C6-alkyl, ethoxypropanol, butyl glycol; glycols, for example, ethylene glycol, propylene glycol, and ketones, e.g., methyl ethyl ketone, acetone, cyclohexanone; N-methylpyrrolidone, N-ethylpyrrolidone, aromatic or aliphatic hydrocarbons, for example, toluene, xylene, or straight-chain or branched aliphatic C6-C12-hydrocarbons. Water-miscible organic solvents are preferred.

The coating compositions, according to the invention, can contain pigments, fillers and/or usual coating additives. All colour and/or special effect-giving pigments of organic or inorganic type used in paints are suitable for pigments. Examples of inorganic or organic colour pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example, from aluminum or copper, interference pigments, such as, for example, aluminum coated with titanium dioxide, coated mica, graphite effect pigments and iron oxide laminae. Examples of fillers are silicon dioxide, barium sulfate, talcum, aluminum silicate and magnesium silicate.

The additives are additives usually used in the paint industry. Examples of such additives are light stabilizers, for example, based on benztriazoles and HALS (hindered amine light stabilizer) compounds, flow control agents based on (meth)acrylic homopolymers or silicon oils, rheology-influencing agents, such as, highly disperse silicic acid or polymeric urea compounds, thickeners, such as, cross-linked polycarboxylic acid or polyurethanes, anti-foaming agents, wetting agents, photoinitiators. The additives are added in the usual amounts familiar to the person skilled in the art.

Additional curing accelerators for the cross-linking reaction, for example, compounds that are not suited to form a catalyst/cyclodextrin compound or that are not present in form of the catalyst/cyclodextrin compound can be used in small amounts, of e.g. up to 0.5% by weight based on the total coating composition.

Generally the coating compositions may contain a catalyst compound C) with a metal catalyst and in addition a free amine catalyst or may contain a catalyst compound C) with an amine catalyst and in addition a free metal catalyst.

For example, it is possible, that the coating compositions contain a catalyst compound C) with a catalyst for the curing reaction between thiol and isocyanate groups, e.g. with an amine catalyst, and contain in addition a free catalyst for the curing reaction between hydroxyl and isocyanate groups, e.g. a metal catalyst, such as a tin catalyst.

The long pot life of the coating compositions according to the invention is particularly advantageous. Conventional coating compositions based on thiol-functional and/or hydroxyl-functional binders, free polyisocyanate crosslinking agents and catalysts are in fact distinguished by only limited pot life if no specific measures have been taken. Generally a rapid reaction occurs between the thiol-functional and/or hydroxyl-functional compounds and the polyisocyanate cross-linking agent when mixed with one another, when a curing catalyst is present. This is perceptible, for example, from a drastic increase in the viscosity of the coating composition. For example, when an amine, such as (1,4-diazabicylco[2.2.2]octane) (DABCO) or dimethyl isopropyl amine, is added to a composition containing thiol-functional and isocyanate-functional compounds an immediate gelation can be observed. Also, when for example a tin catalyst, such as dibutyl tin dilaurate is added to a composition containing hydroxyl-functional and isocyanate-functional compounds an immediate reaction can be observed. In contrast to that the pot life of the coating compositions according to the invention is substantially long due to the presence of the latent catalyst compound C). The pot life after mixing (when A and B and C are brought into contact) amounts, for example, from 60 minutes up to 20 hours.

It was surprising that a sufficient long pot-life and simultaneously fast curing with the very fast reacting thiol/isocyanate coating system could be achieved, when using the catalyst/cyclodextrin compound C)

It was also surprising that in an aqueous environment the latent catalyst compound C) has been practically inactive over a period of time and has become active after and/or during application and/or film formation. Clear films could be obtained with the coating composition according to the invention, that allows formulation of transparent clear topcoats.

The coating compositions of the present invention may be used for the production of single-layer coatings or for the production of one or more coating layers within a multilayer coating, such as, in particular, an automotive multilayer coating, either on an automotive body or on an automotive body part. This may relate to both original and repair coating applications. The coating compositions may in particular be used in pigmented form for the production of a primer surfacer layer or a single stage top coat layer or in pigment-free form for the production of an outer clear top coat layer or a transparent sealing layer of a multilayer coating. They may, for example, be used for the production of a clear top coat layer on a previously applied color-imparting and/or special effect-imparting pre-dried base coat layer.

The coating compositions may be applied by means of conventional application methods, in particular, by spraying onto any desired uncoated or precoated substrates, for example, of metal or plastics. Once applied, layers of the coating compositions according to the invention may initially be flashed off to remove water and optionally present organic solvent, for example. Curing may then proceed at ambient temperature or thermal curing may proceed at temperatures of, for example, 40 to 220° C., for example, by baking or irradiating with IR radiation (IR=Infra Red) for 5 to 30 minutes. Radiating with IR radiation can be carried out with usual IR dryers, for example for 3 to 6 minutes at a distance IR dryer/object surface of 50-80 cm. During and/or after releasing the catalyst from the catalyst/cyclodextrin compound C) the catalyst becomes active to catalyze the curing reaction.

If the coating compositions according to the invention are dual-cure coating compositions, thermal curing is combined with curing by free-radical polymerization of olefinic double bonds induced by irradiation with high-energy radiation, in particular UV radiation. Thermal curing and radiation curing may here proceed simultaneously or in any desired order.

Therefore, the present invention also relates to the use of water-based coating compositions as defined above in a process for preparing a coating layer, comprising the steps:
1) applying a coating layer from a water-based coating composition as defined above, and
2) thermally curing the coating layer.

Optionally, the applied coating layer may be flashed off to remove water and organic solvent, if present.

Besides the improved pot-life, in particular besides the extremely improved pot-life in case of thiol containing coating compositions the coating compositions according to the present invention cure very fast and lead to coatings with excellent early polishing properties and early tack-free time. Also, a faster early hardness development has been observed compared with coating compositions containing the corresponding free catalyst. Furthermore, the coating compositions according to the invention lead to coatings with excellent appearance, e.g. coatings with high gloss and without surface defects such as pinholes, even at relatively high coating thicknesses of, for example, 60 to 70 μm. Also, the water-based coating compositions do not display any visual defects caused by the production of reaction bubbles resulting from the reaction of isocyanate and water.

EXAMPLES

Example 1

Preparation of Catalyst Compounds C)

Catalyst compound C1 was formulated with the ingredients shown in Table 1.

TABLE 1

| | Parts by weight |
|---|---|
| Cyclodextrin (Cavasol ® W7HP) | 7.21 |
| Ethanol | 10.81 |
| 40% solution of DBTDL in Ethanol | 1.97 |

Cavasol ® W7HP: commercially available hydroxypropyl cyclodextrin, from Wacker
Catalyst: DBTL, dibutyl tin dilaurate 7.21 parts by weight of cyclodextrin have been dissolved at room temperature under stirring in 10.81 parts by weight of ethanol. After complete dissolution the DBTDL-solution has been added. The mixture has been stirred at room temperature for 20 hours.

Afterwards the mixture has been dried at a temperature of 60° C. by means of a rotating evaporator until a residue content of solvent of <2% by weight has been reached.

Example 2

Preparation of Clear Coat Compositions

Clear coat compositions based on a hydroxy-functional compound have been used as clear coat base components. A clear coat base component according to the invention containing an DBTL/cyclodextrin compound was formulated and comparative clear coat base components without catalyst for the OH/NCO reaction were formulated as well as comparative clear coat base components containing the free catalyst.

Desmodur® XP 2410, a low viscosity aliphatic polyisocyanate based on hexamethylene diisocyanate from Bayer, has been used as cross-linking agent.

Clear coat base components were formulated by mixing ingredients 1 to 3 in the given order as shown in Table 2. Cross-linking agents were formulated by mixing ingredients 4 and 6 as shown in Table 2.

Then clear coat base components and cross-linking agents each have been mixed and homogenized to form a clear coat (CC3 with cyclodextrin compound C1); and comparative clear coats 1 and 2 (Comp. CC1 without catalyst for OH/NCO reaction, Comp CC2 with free DBTL catalyst). Then the comparative clear coats CC1 and CC2 were diluted with deionised water (ingredient 7). The clear coat CC3 was diluted with a solution of ingredient 8 in 7.

TABLE 2

| | | CC1 | CC2 | CC3 |
|---|---|---|---|---|
| 1 | Acrylic Resin Dispersion | 77.80 | 77.80 | 77.80 |
| 2 | Deionised water | 0.35 | 0.35 | 0.35 |
| 3 | Butoxy propanol | 6.93 | 6.93 | 6.93 |
| 4 | Desmodur ® XP2410 | 20.05 | 20.05 | 20.05 |
| 5 | BGA | 5.01 | 5.01 | 5.01 |
| 6 | DBTL | | 0.05 | |
| 7 | Deionised water | 12.94 | 12.94 | 12.94 |
| 8 | Catalyst Compound C1 | | | 0.55 |

The amounts given in Table 2 are parts by weight.
BGA: Ethylene glycol monobutyl ether acetate
Acrylic Resin Dispersion: The acrylic copolymer prepared according to example 2 of WO 2006/026671 has been used.

The clear coat and comparative clear coats 1 and 2 have been applied with a doctor blade to coil coating panels in a resulting dry film thickness of about 40 μm. Drying performance has been determined via pendulum hardness after 30 min flash off and curing 10 min at 60° C. Measurement results and evaluation are given in Tables 3 and 4.

TABLE 3

| | CC1 | CC2 | CC3 |
|---|---|---|---|
| Pendulum hardness after 1 h | 33 | 35 | 62 |
| Pendulum hardness after 2 h | 50 | 49 | 76 |
| Pendulum hardness after 3 h | 63 | 52 | 88 |

TABLE 3-continued

|  | CC1 | CC2 | CC3 |
|---|---|---|---|
| Pendulum hardness after 24 h | 127 | 109 | 143 |

TABLE 4

|  | CC1 | CC2 | CC3 |
|---|---|---|---|
| NCO content in % after activation (0 h) | 2.38 | 2.05 | 2.34 |
| NCO content in % after activation (1 h) | 2.22 | 1.54 | 1.87 |
| NCO content in % after activation (2 h) | 2.13 | 1.08 | 1.44 |
| Mixture gelled after | 6 h | 3 h | 5 h |

Pendulum hardness (König) has been measured after curing 24 hours at room temperature (according to standard DIN 53505)

The NCO content was determined according to EN ISO 11909. The consumption of HCl was corrected for the consumption of HCl that was used to determine the amine value of the dispersion according to DIN 53176.

The results clearly show that the clear coat composition prepared according to the invention has a prolonged potlife compared to the comparative clear coat 2, as has been demonstrated by less NCO consumption after activation. Furthermore the time until gelling of the mixture occurred was significantly increased.

The results regarding pendulum hardness show, that the clear coat according to the invention has a remarkably increased early hardness compared to the comparative clear coats CC1 and CC2, indicating that the catalyst is released during curing.

The invention claimed is:

1. Water-based two-component coating composition comprising:
    A) at least one cross-linkable compound having at least one functional group containing active hydrogen,
    B) at least one polyisocyanate cross-linking agent with at least one free isocyanate group,
    C) at least one catalyst compound, said catalyst compound comprising at least one cyclodetrin and at least one catalyst for the curing reaction between the at least one functional group containing active hydrogen of the at least one cross-linkable compound A) and the at least one free isocyanate group of the at least one polyisocyanate cross-linking agent B).

2. The water-based two-component coating composition of claim 1, comprises the at least one catalyst compound C) in a ratio by weight solids of catalyst compound C) to the sum of weight solids of the at least one cross-linkable compound A) and the at least one polyisocyanate cross-linking agent B) of 0.5 to 15.

3. The water-based two-component coating composition of claim 1, comprising the at least one catalyst compound C) in a ratio by weight solids of the at least one catalyst compound C) to the sum of weight solids of the at least one cross-linkable compound A) and the at least one polyisocyanate cross-linking agent B) of 1 to 8.

4. The water-based two-component coating composition of claim 1, wherein the at least catalyst comprises an amine catalyst.

5. The water-based two-component coating composition of claim 1, wherein the at least one catalyst comprises a metal catalyst.

6. The water-based two-component coating composition of claim 1, wherein the at least one cyclodextrin comprises methylated and/or hydroxypropylated cyclodextrin.

7. The water-based two-component coating composition of claim 1, wherein the at least one cross-linkable compound A) contains at least one thiol and/or hydroxyl group.

8. The water-based two-component coating composition of claim 1, wherein the at least one cross-linkable compound A) comprises pentaerythritol tetrakis(3-mercapto propionate) and/or trimethylolpropane tris(3-mercaptopropionate).

9. The water-based two-component coating composition of claim 1, wherein the at least one cross-linkable compound A) comprises at least one compound selected from the group consisting of hydroxyl-functional (meth)acrylic copolymers, hydroxyl-functional polyesters, hydroxyl-functional polyurethanes and mixtures thereof.

10. The water-based two-component coating composition of claim 1, wherein the at least one catalyst compound C) is a solid compound.

11. The water-based two-component coating composition of claim 1, wherein the at least one catalyst compound C) is a liquid compound.

12. The water-based two-component coating composition of claim 1, wherein the at least one catalyst compound C) is an aqueous solution or dispersion.

13. A process for preparing a coating layer comprising the steps:
    applying a coating layer from a water-based two-component coating composition of claim 1,
    optionally, flashing off the applied coating layer to remove organic solvent and/or water, and
    thermally curing the coating layer.

14. The process of claim 13, wherein the water-based two-component coating composition is applied as a primer, a primer surfacer, a clear top coat composition or a pigmented single-stage top coat composition.

15. A process for preparing a water-based two-component coating composition comprising the steps:
    I. Providing A) at least one cross-linkable compound having at least one functional group containing active hydrogen,
    II. Mixing the at least one cross-linkable compound provided in step I with C) at least one catalyst compound, said catalyst compound comprising at least one cyclodetrin and at least one catalyst for the curing reaction between the at least one functional group containing active hydrogen of the at least one cross-linkable compound A) and at least one free isocyanate group of B) at least one polyisocyanate cross-linking agent with at least one free isocyanate group and
    III. Mixing the composition obtained in step II with the at least one polyisocyanate cross-linking agent B).

16. The process of claim 15, further comprising forming a solution of the at least one cyclodextrin and the at least one catalyst to form the at least one catalyst compound C) prior to mixing the at least one cross-linkable compound provided in step I with the at least one catalyst compound C).

* * * * *